(12) United States Patent
Sung et al.

(10) Patent No.: US 12,159,640 B2
(45) Date of Patent: Dec. 3, 2024

(54) METHODS OF ENCODING AND DECODING, ENCODER AND DECODER PERFORMING THE METHODS

(71) Applicant: ELECTRONICS AND TELECOMMUNICATIONS RESEARCH INSTITUTE, Daejeon (KR)

(72) Inventors: Jongmo Sung, Daejeon (KR); Seung Kwon Beack, Daejeon (KR); Tae Jin Lee, Daejeon (KR); Woo-taek Lim, Daejeon (KR); Inseon Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 218 days.

(21) Appl. No.: 17/884,364

(22) Filed: Aug. 9, 2022

(65) Prior Publication Data

US 2023/0048402 A1    Feb. 16, 2023

(30) Foreign Application Priority Data

Aug. 10, 2021  (KR) .................. 10-2021-0105332
Jun. 28, 2022   (KR) .................. 10-2022-0079045

(51) Int. Cl.
*G10L 19/06*    (2013.01)
*G06N 3/045*    (2023.01)

(52) U.S. Cl.
CPC .............. *G10L 19/06* (2013.01); *G06N 3/045* (2023.01)

(58) Field of Classification Search
CPC .................................. G10L 19/06; G06N 3/045
See application file for complete search history.

(56) References Cited

U.S. PATENT DOCUMENTS

| 2010/0088091 | A1 | 4/2010 | Lee |
| 2010/0114566 | A1* | 5/2010 | Sung .................. G10L 19/22 |
| | | | 704/219 |

(Continued)

FOREIGN PATENT DOCUMENTS

| KR | 10-2020-0039530 A | 4/2020 |
| KR | 10-2021-0003507 A | 1/2021 |

OTHER PUBLICATIONS

Kai Zhen et al., "Cascaded Cross-Module Residual Learning towards Lightweight End-to-End Speech Coding," Interspeech 2019, Sep. 15-19, 2019, Graz, Austria.

(Continued)

*Primary Examiner* — Ibrahim Siddo

(57) ABSTRACT

Provided is an encoding method according to various example embodiments and an encoder performing the method. The encoding method includes outputting a linear prediction (LP) coefficients bitstream and a residual signal by performing a linear prediction analysis on an input signal, outputting a first latent signal obtained by encoding a periodic component of the residual signal, using a first neural network module, outputting a first bitstream obtained by quantizing the first latent signal, using a quantization module, outputting a second latent signal obtained by encoding an aperiodic component of the residual signal, using the first neural network module, and outputting a second bitstream obtained by quantizing the second latent signal, using the quantization module, wherein the aperiodic component of the residual signal is calculated based on a periodic component of the residual signal decoded from the quantized first latent signal output by de-quantizing the first bitstream.

14 Claims, 8 Drawing Sheets

(56) References Cited

U.S. PATENT DOCUMENTS

2013/0030795 A1* 1/2013 Sung .................. G10L 19/0212
                                                                704/E19.01
2013/0218578 A1 8/2013 Gao
2020/0227061 A1 7/2020 Lee

OTHER PUBLICATIONS

Srihari Kankanahali, "End-To-End Optimized Speech Coding With Deep Neural Networks," ICASSP 2018, Apr. 15-20, 2018.
Yang Yang et al., "Feedback Recurrent Autoencoder", ICASSP 2020, May 4-8, 2020.
Bruno Bessette et al. "The Adaptive Multirate Wideband Speech Codec (AMR-WB)," IEEE Transactions On Speech and Audio Processing, Nov. 2002, vol. 10, No. 8.

* cited by examiner

METHODS OF ENCODING AND DECODING, ENCODER AND DECODER PERFORMING THE METHODS

CROSS-REFERENCE TO RELATED APPLICATIONS

This application claims the benefit of Korean Patent Application No. 10-2021-0105332 filed on Aug. 10, 2021, and Korean Patent Application No. 10-2022-0079045 filed on Jun. 28, 2022, in the Korean Intellectual Property Office, the entire disclosures of which are incorporated herein by reference for all purposes.

BACKGROUND

1. Field of the Invention

One or more example embodiments relate to an encoding method, a decoding method, an encoder performing the encoding method, and a decoder performing the decoding method.

2. Description of the Related Art

With the development of deep learning technology, deep learning technology is being used in various fields such as speech, audio, language, and image signal processing.

For compression and decompression of a speech signal, a code-excited linear prediction (CELP) method is used. A perceptual audio encoding method based on a psychoacoustic model is used for compression and reconstruction of an audio signal.

In addition, various methods of encoding speech and audio signals based on a deep autoencoder has been proposed.

SUMMARY

A feed-forward autoencoder method developed for still image encoding may efficiently encode a non-sequential signal such as a still image, but may be inefficient in encoding a sequential signal containing periodicity such as speech or audio. A recurrent autoencoder method may be effective for modeling a temporal structure of a signal based on a recurrent neural network (RNN) suitable for sequential signal modeling, but may be inefficient for encoding aperiodic components. Example embodiments provide an encoding and decoding method for improving quality and compression efficiency by efficiently encoding periodic and aperiodic/noisy components of sequential signals such as speech and audio signals, and an codec performing the encoding and decoding method.

Example embodiments also provide an encoding and decoding method for improving quality and compression efficiency of speech and audio signals by using a dual-path neural network structure applicable to both speech and audio signals, and an codec performing the encoding and decoding method.

However, the technical tasks are not limited to the above-described technical tasks, and other technical tasks may exist.

According to an aspect, there is provided an encoding method including outputting linear prediction (LP) coefficients bitstream and a residual signal by performing an LP analysis on an input signal, outputting a first latent signal obtained by encoding a periodic component of the residual signal using a first neural network module, outputting a first bitstream obtained by quantizing the first latent signal using a quantization module, outputting a second latent signal obtained by encoding an aperiodic component of the residual signal using the first neural network module, and outputting a second bitstream obtained by quantizing the second latent signal using the quantization module, wherein the aperiodic component of the residual signal is calculated based on a periodic component of the residual signal decoded from the quantized first latent signal output by de-quantizing the first bitstream.

The outputting of the second latent signal may include outputting the quantized first latent signal by de-quantizing the first bitstream, using a de-quantization module, reconstructing the periodic component of the residual signal from the quantized first latent signal, using the first neural network module, calculating, using the reconstructed periodic component of the residual signal and the original residual signal, the aperiodic component of the residual signal, and encoding the aperiodic component of the residual signal, using the first neural network module.

The outputting of the residual signal may include calculating LP coefficients from the input signal, outputting the LP coefficients bitstream by quantizing the LP coefficients, reconstructing the quantized LP coefficients by de-quantizing the LP coefficients bitstream, and calculating a residual signal using the input signal and the quantized LP coefficients.

The first neural network module may include a first neural network block to encode the periodic component of the residual signal, a second neural network block to decode the quantized first latent signal, and a third neural network block to encode the aperiodic component of the residual signal.

The first neural network block and the second neural network block may include recurrent neural networks, the third neural network block may include a feed-forward neural network.

According to another aspect, there is also provided an encoding method including outputting LP coefficients bitstream and a residual signal by performing an LP analysis on an input signal, outputting a first latent signal obtained by encoding a periodic component of the residual signal using a first neural network module, outputting a first bitstream obtained by quantizing the first latent signal using a quantization module, outputting the quantized first latent signal by de-quantizing the first bitstream using a de-quantization module, reconstructing the periodic component of the residual signal from the quantized first latent signal using the first neural network module, calculating the aperiodic component of the residual signal using the reconstructed periodic component of the residual signal and the original residual signal, outputting a second latent signal obtained by encoding an aperiodic component of the residual signal using the first neural network module; and outputting a second bitstream obtained by quantizing the second latent signal using the quantization module.

The outputting of the residual signal may include calculating LP coefficients using the input signal, outputting the LP coefficients bitstream by quantizing the LP coefficients, reconstructing the quantized LP coefficients by de-quantizing the LP coefficients bitstream, and calculating a residual signal using the input signal and the quantized LP coefficients.

The first neural network module may include a first neural network block to encode the periodic component of the residual signal, a second neural network block to decode the quantized first latent signal, and a third neural network block to encode the aperiodic component of the residual signal.

The first neural network block and the second neural network block may include recurrent neural networks, the third neural network block may include a feed-forward neural network.

According to another aspect, there is also provided a decoding method including outputting a quantized LP coefficients, a quantized first latent signal, and a quantized second latent signal by de-quantizing LP coefficients bitstream, a first bitstream, and a second bitstream, reconstructing a first residual signal by decoding the quantized first latent signal, using a second neural network module, reconstructing a second residual signal by decoding the quantized second latent signal using the second neural network module, reconstructing a residual signal using the reconstructed first residual signal and the reconstructed second residual signal, and synthesizing an output signal using the reconstructed residual signal and the quantized LP coefficients.

According to another aspect, there is also provided an encoder including a processor, wherein the processor is configured to output LP coefficients bitstream and a residual signal by performing an LP analysis on an input signal, output a first latent signal obtained by encoding a periodic component of the residual signal, using a first neural network module, outputting a second latent signal obtained by encoding an aperiodic component of the residual signal, using the first neural network module, and output a first bitstream and a second bitstream obtained by quantizing the first latent signal and the second latent signal, using a quantization module. The aperiodic component of the residual signal is calculated based on a periodic component of the residual signal decoded from the quantized first latent signal output obtained by de-quantizing the first bitstream.

The processor may be configured to output the quantized first latent signal by de-quantizing the first bitstream, using a de-quantization module, decode the periodic component of the residual signal from the quantized first latent signal, using the first neural network module, calculate the aperiodic component of the residual signal using the decoded periodic component of the residual signal and the residual signal, and output the second latent signal by encoding the aperiodic component of the residual signal using the first neural network module.

The processor may be configured to calculate LP coefficients from the input signal, output the LP coefficients bitstream by quantizing the LP coefficients, reconstruct the quantized LP coefficients by de-quantizing the LP coefficients bitstream, and calculate a residual signal using the input signal and the quantized LP coefficients.

The first neural network module may include a first neural network block to encode the periodic component of the residual signal, a second neural network block to decode the quantized first latent signal, and a third neural network block to encode the aperiodic component of the residual signal.

The first neural network block and the second neural network block may include recurrent neural networks, the third neural network block may include a feed-forward neural network, and the second neural network block may have a structure symmetric to a structure of the first neural network block such as a general autoencoder.

According to another aspect, there is also provided a decoder including a processor, wherein the processor is configured to output quantized LP coefficients, a quantized first latent signal, and a quantized second latent signal by de-quantizing LP coefficients bitstream, a first bitstream, and a second bitstream, reconstruct a first residual signal by decoding the quantized first latent signal, using a second neural network module, reconstruct a second residual signal by decoding the quantized second latent signal using the second neural network module, reconstruct a residual signal, using the reconstructed first residual signal and the reconstructed second residual signal, and synthesize an output signal, using the reconstructed residual signal and the quantized LP coefficients.

Additional aspects of example embodiments will be set forth in part in the description which follows and, in part, will be apparent from the description, or may be learned by practice of the disclosure.

According to example embodiments, by combining two types of neural networks with different attributes in an LP framework to model periodic and aperiodic components of speech and audio signals, it is possible to solve issues of a traditional encoding and decoding method optimized only for speech signals and improve an coding quality of both speech and audio signal.

According to various example embodiments, by removing spectral characteristics inherent in signals such as speech and audio through an effect of spectral whitening according to an LP analysis, it is possible to obtain a neural network model more robust to various signal characteristics and resolve a discrepancy between a training set and a test set of a neural network model without a sophisticated regularization method.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
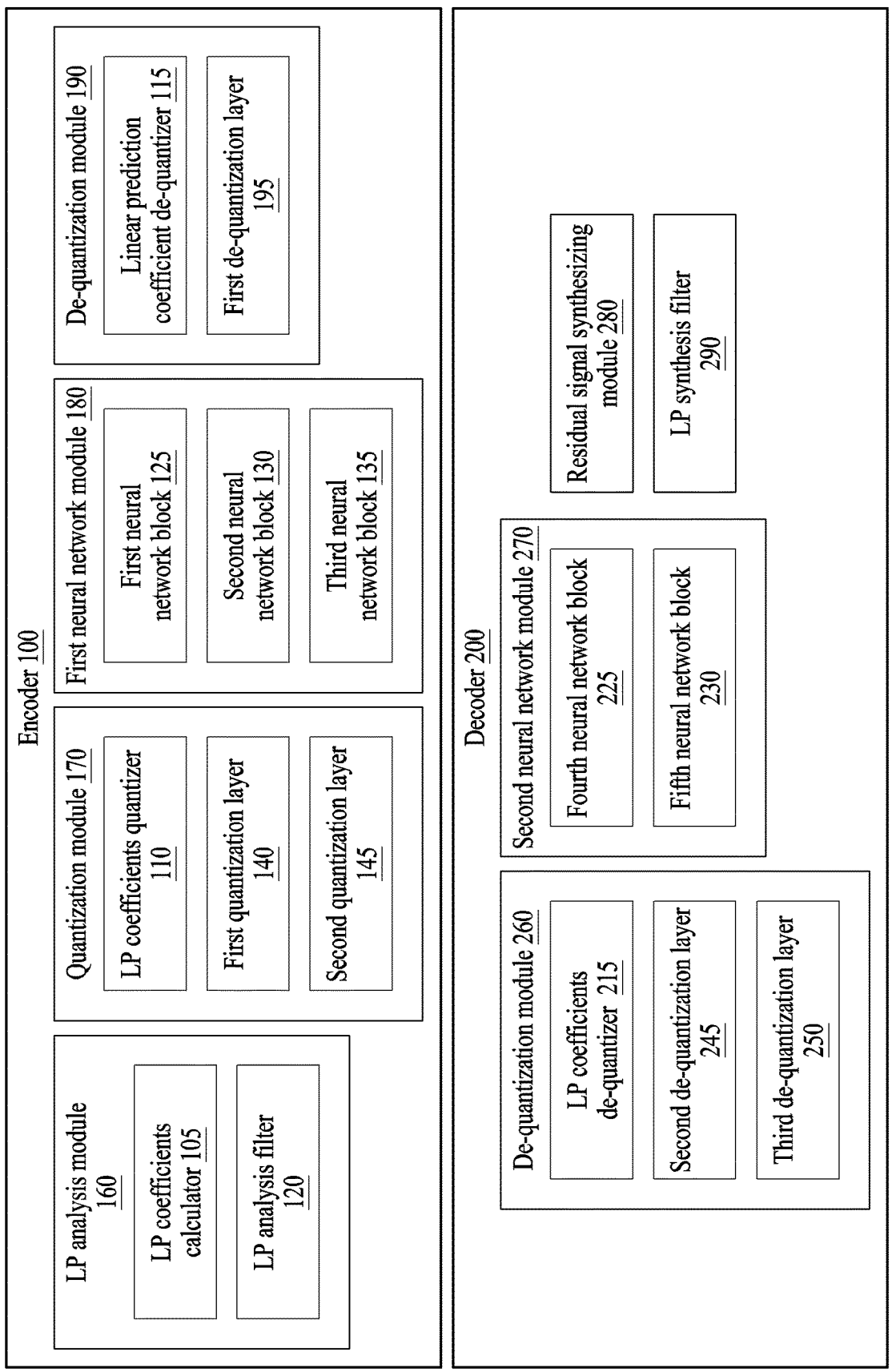
FIG. 1 is a block diagram illustrating an encoder and a decoder according to various example embodiments.

The following structural or functional descriptions of example embodiments described herein are merely intended for the purpose of describing the example embodiments described herein and may be implemented in various forms. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

As used herein, the term "module" may include a unit implemented in hardware, or hardware programmed with software, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

As used herein, the term "-unit" or "-er(or)" means software or hardware constituent element such as a FPGA or an ASIC, and '-part' performs certain roles. However, "-unit" or "-er(or)" is not limited to software or hardware. "-unit" or "-er(or)" may be configured to reside in an addressable storage medium or may be configured to operate one or more processors. Thus, as an example, "-unit" or "-er(or)" may include constituent elements such as software constituent elements, object-oriented software constituent elements, class constituent elements, and task constituent elements, and processes, functions, properties, procedures, subroutines, segments of program code, drivers, firmware, microcodes, circuitry, data, databases, data structures, tables, arrays, and variables. The functions provided in the constituent elements and "-unit" or "-er(or)" may be combined into a smaller number of constituent elements and "-unit" or "-er(or)" or further separated into additional constituent elements and "-unit" or "-er(or)". In addition, constituent elements and "-unit" or "-er(or)" may be implemented to operate one or more CPUs in a device or secure multimedia card. Also, "-unit" or "-er(or)" may include one or more processors.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a block diagram illustrating an encoder 100 and a decoder 200 according to various example embodiments.

Referring to FIG. 1, the encoder 100 may include at least one of an LP analysis module 160, a quantization module 170, a first neural network module 180, or a de-quantization module 190. The decoder 200 may include at least one of a de-quantization module 260, a second neural network module 270, a residual signal synthesizing module 280, or a LP synthesis filter 290.

Referring to FIG. 1, the encoder 100 may output a first bitstream and/or a second bitstream obtained by encoding a speech signal or an audio signal corresponding to an input signal and output LP coefficients bitstream obtained by quantizing LP coefficients.

The decoder 200 may output an output signal restored from the input signal using the first bitstream, the second bitstream, and the LP coefficients bitstream input from the encoder 100.

For example, a processor of the encoder 100 may output a residual signal and the LP coefficients bitstream by performing an LP analysis on the input signal, using the LP analysis module 160.

For example, the LP analysis module 160 may include at least one of LP coefficients calculator 105 and an LP analysis filter 120.

For example, the processor of the encoder 100 may use the LP coefficients calculator 105 to calculate the LP coefficients for each frame corresponding to an analysis unit of the input signal.

For example, the processor of the encoder 100 may input the LP coefficients to the quantization module 170, thereby outputting the LP coefficients bitstream. For example, the processor of the encoder 100 may input the LP coefficients to the LP coefficients quantizer 110 and output the LP coefficients bitstream from the LP coefficients quantizer 110. For example, the quantization module 170 may include the LP coefficients quantizer 110.

For example, the processor of the encoder 100 may input the LP coefficients bitstream to the de-quantization module 190, thereby outputting the quantized LP coefficients. For example, the processor of the encoder 100 may de-quantize the LP coefficients bitstream using the LP coefficients de-quantizer 115 and calculate the quantized LP coefficients. For example, the de-quantization module 190 may include the LP coefficients de-quantizer 115.

For example, the processor of the encoder 100 may calculate the residual signal in the input signal based on the quantized LP coefficients, using the LP analysis filter 120.

For example, using the first neural network module 180 trained, the processor of the encoder 100 may output a first latent signal obtained by encoding a periodic component of the residual signal and a second latent signal obtained by encoding an aperiodic component of the residual signal.

For example, the first neural network module 180 may include at least one of a first neural network block 125, a second neural network block 130, or a third neural network block 135. For example, the first neural network block 125 may indicate a neural network trained to input the residual signal and output the first latent signal. For example, the second neural network block 130 may be trained to input the first latent signal quantized and output the periodic component of the residual signal decoded. For example, the third neural network block 135 may be trained to input the aperiodic component of the residual signal and output the second latent signal.

For example, the processor of the encoder 100 may input the residual signal to the trained first neural network block 125 and output the first latent signal.

For example, the processor of the encoder 100 may output the first bitstream obtained by quantizing the first latent signal, using the quantization module 170. For example, the processor may output the first bitstream obtained by quantizing the first latent signal using a first quantization layer 140. For example, the quantization module 170 may include the first quantization layer 140.

For example, the processor of the encoder 100 may input the aperiodic component of the residual signal to the trained third neural network block 135 and output the second latent signal. For example, the aperiodic component of the residual signal may indicate a signal obtained by removing the periodic component of the decoded residual signal from the residual signal.

For example, the processor of the encoder 100 may output the quantized first latent signal by de-quantizing the first bitstream. For example, the processor may output the quantized first latent signal by de-quantizing the first bitstream, using a first de-quantization layer 195. For example, the de-quantization module 190 may include the first de-quantization layer 195.

For example, the processor of the encoder 100 may input the quantized first latent signal to the trained second neural network block 130, thereby outputting the decoded residual signal. For example, the decoded residual signal output from the second neural network block 130 may indicate the periodic component of the decoded residual signal.

For example, the processor of the encoder 100 may calculate the aperiodic component of the residual signal using a difference between the residual signal and the periodic component of the decoded residual signal. The processor may input the aperiodic component of the residual signal to the third neural network block 135 and output the second latent signal.

For example, the first latent signal or the second latent signal may indicate an encoded code vector or bottleneck.

For example, the processor of the encoder 100 may output the second bitstream obtained by quantizing the second latent signal, using the quantization module 170. For example, the processor may output the second bitstream obtained by quantizing the second latent signal, using a second quantization layer 145. For example, the quantization module 170 may include the second quantization layer 145.

For example, the quantization module 170 may include at least one of the LP coefficients quantizer 110, the first quantization layer 140, or the second quantization layer 145.

For example, the processor of the encoder 100 may output the LP coefficients bitstream by quantizing the LP coefficients output from the LP coefficients calculator 105, using the LP coefficients quantizer 110.

For example, the processor of the encoder 100 may output the first bitstream by quantizing the first latent signal output from the first neural network block 125, using the first quantization layer 140.

For example, the processor of the encoder 100 may output the second bitstream by quantizing the second latent signal output from the second neural network block 130, using the second quantization layer 145.

For example, a processor of the decoder 200 may de-quantize the LP coefficients bitstream, the first bitstream, and the second bitstream, using the de-quantization module 260. For example, the processor of the decoder 200 may output the quantized LP coefficients, the quantized first latent signal, and the quantized second latent signal.

For example, the de-quantization module 260 may include at least one of LP coefficients de-quantizer 215, a second de-quantization layer 245, or the third de-quantization layer 250.

For example, the processor of the decoder 200 may output the quantized LP coefficients by de-quantizing the input LP coefficients bitstream using the LP coefficients de-quantizer 215.

For example, the processor of the decoder 200 may output the quantized first latent signal by de-quantizing the input first bitstream using the second de-quantization layer 245.

For example, the processor of the decoder 200 may output the quantized second latent signal by de-quantizing the second bitstream using the third de-quantization layer 250.

For example, using the trained second neural network module 270, the processor of the decoder 200 may output a first residual signal obtained by decoding the quantized first latent signal and a second residual signal obtained by decoding the quantized second latent signal. For example, the decoded first residual signal may indicate the periodic component of the decoded residual signal. For example, the decoded second residual signal may indicate the aperiodic component of the decoded residual signal.

For example, the second neural network module 270 may include a fourth neural network block 225 or a fifth neural network block 230. For example, the processor of the decoder 200 may input the quantized first latent signal to the fourth neural network block 225 trained and output the first residual signal obtained by decoding the first latent signal input from the fourth neural network block 225. For example, the processor of the decoder 200 may input the quantized second latent signal to the fifth neural network block 230 and output the second residual signal obtained by decoding the quantized second latent signal from the fifth neural network block 230.

The first neural network block 125 may indicate an encoder of an autoencoder having a recurrent structure or a feed-forward neural network structure for modeling a periodic component of a speech signal or an audio signal. The second neural network block 130 and/or the fourth neural network block 225 may indicate a decoder of an autoencoder having a recurrent structure for modeling a periodic component of a speech signal or an audio signal.

For example, the first neural network block 125 may output a code vector, that is, a latent signal using a signal input from an input layer. A code vector may indicate an expression that an input signal and an output signal are generally reduced in dimension under the same constraints due to characteristics of a signal encoder and a signal decoder.

The second neural network block 130 and/or the fourth neural network block 225 may output a restored signal using the code vector output from the first neural network block 125. A signal output from the second neural network block 130 and/or the fourth neural network block 225 may indicate a signal restored from a signal input to the first neural network block 125.

For example, to the third neural network block 135, the description of the first neural network block 125 may apply substantially the same. In addition, to the fifth neural network block 230, the description of the second neural network block 130 and/or the fourth neural network block 225 may apply substantially the same. For example, the third neural network block 135 may output a code vector, that is, a latent signal using a signal input to an input layer. The fifth neural network block 230 may output the restored signal using the code vector output from the third neural network block 135. A signal output from a fifth neural network block may indicate a signal restored from a signal input to the third neural network block 135.

In the above-described example, an autoencoder in which the third neural network block 135 and the fifth neural network block 230 are combined may have a recurrent structure or a feed-forward neural network structure for modeling an aperiodic component of a speech or audio signal.

For example, the processor of the decoder 200 may synthesize the residual signal based on the decoded first residual signal and the decoded second residual signal using the residual signal synthesizing module 280. The residual signal synthesized in the residual signal synthesizing module 280 may indicate a signal restored from the residual signal output from the LP analysis filter 120 of the encoder 100.

For example, the processor of the decoder 200 may synthesize an output signal based on the residual signal and the LP coefficients using the LP synthesis filter 290. For example, the residual signal synthesized in the residual signal synthesizing module 280 and the LP coefficients output from the de-quantization module 260 may be input to the LP synthesis filter 290. The output signal synthesized in the LP synthesis filter 290 may indicate a signal restored from an input signal input to the encoder 100.

Encoding and decoding methods according to various example embodiments of the present disclosure may improve an encoding quality in an encoding process of a sequential signal such as an audio signal or a speech signal, and prevent overfitting of a neural network model that encodes or decodes a residual signal.

According to an example embodiment of the present disclosure, the encoder 100 may model the residual signal through dual-path neural networks.

According to an example embodiment, the first neural network block 125 may include a recurrent neural network for modeling a periodic component of a residual signal using an input residual signal. The third neural network block 135 may include a feed-forward neural network for modeling an aperiodic component of the input residual signal. The second neural network block 130 may include a recurrent neural network for decoding the periodic component of the residual signal.

The encoder 100 according to an example embodiment may encode the residual signal through the dual-path neural networks using the first neural network block 125 which encodes the periodic component of the residual signal and the third neural network block 135 which encodes the aperiodic component of the residual signal.

The block diagram of FIG. 1 illustrating the encoder 100 and the decoder 200 is provided for ease and convenience of description, and configurations of the encoder 100 and the decoder 200 of FIG. 1 may be programs and software to be executed by a processor.

The inclusion relationship of FIG. 1, an inclusion relationship of the configurations, and the like are exemplary and are not limited to the example embodiment shown in FIG. 1. For example, unlike the example embodiment shown in FIG. 1, the LP analysis module 160 may include the LP coefficients quantizer 110 and/or the LP coefficients de-quantizer 115.

Figure 2:
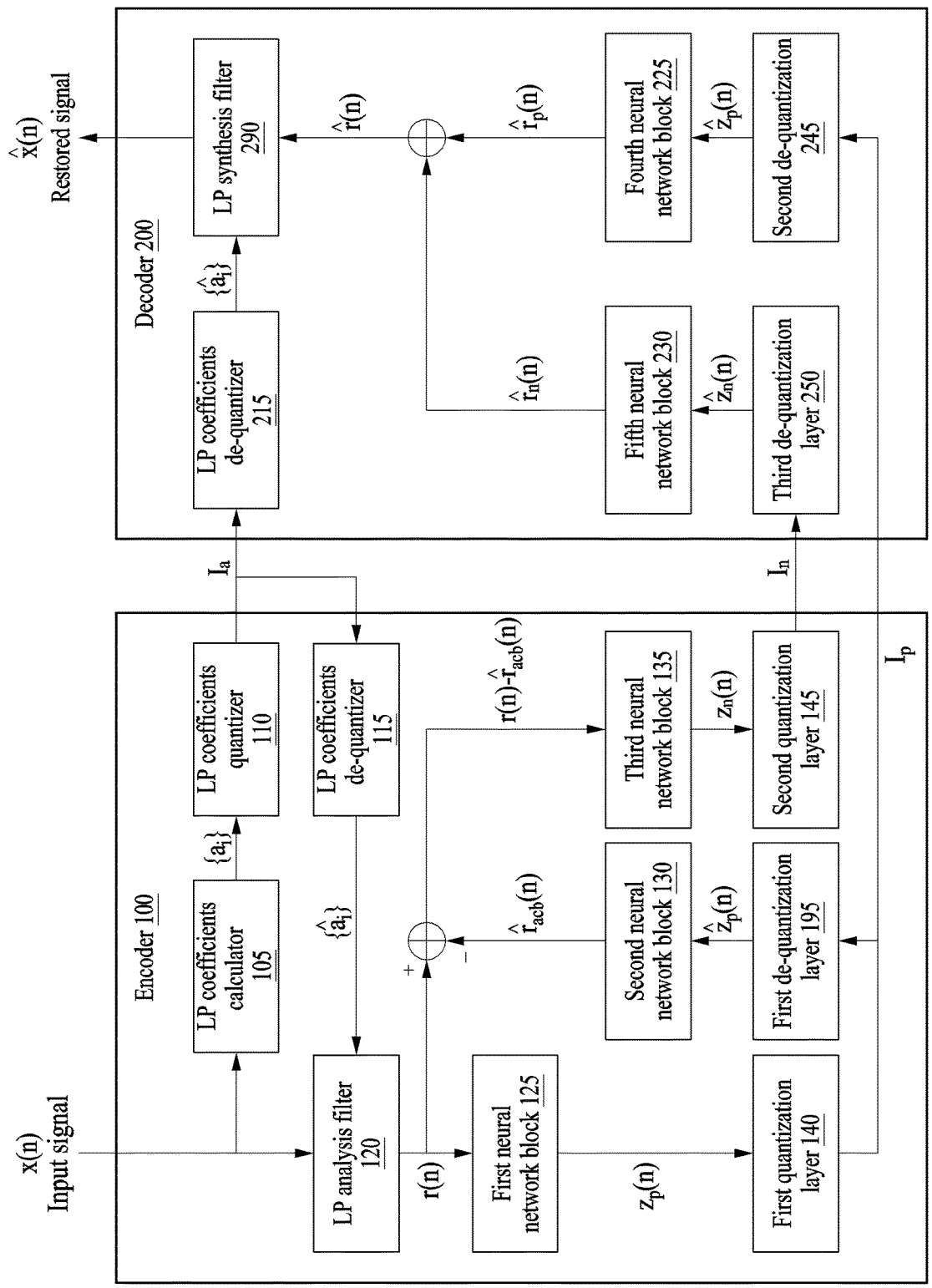
FIG. 2 is a diagram illustrating operations of an encoder and a decoder according to various example embodiments.

FIG. 2 is a diagram illustrating operations of the encoder 100 and the decoder 200 according to various example embodiments.

For example, the processor of the encoder 100 may calculate LP coefficients $\{a_i\}$ based on an input signal x(n) using the LP coefficients calculator 105. A linear prediction may refer to predicting a current sample based on a linear sum of p previous samples. Through the LP analysis, the LP coefficients calculator 105 may calculate the LP coefficients using a sample in an analysis frame. As shown in Equation 1, the processor of the encoder 100 may calculate an input signal $\tilde{x}(n)$ predicted in the LP coefficients calculator 105 and calculate a prediction error E according to Equation 2. The processor of the encoder 100 may calculate LP coefficients $\{a_i\}_{i=1,\ldots,p}$ for minimizing the prediction error E using the LP coefficients calculator 105.

$$\tilde{x}(n)=\sum_{i=1}^{P}a_i x(n-i), n=0,\ldots,(N-1) \quad \text{[Equation 1]}$$

In Equation 1, $\tilde{x}(n)$ denotes a predicted input signal and N denotes a number of samples included in the analysis frame.

$$E=\sum_{n=0}^{N-1}\{e(n)\}^2=\sum_{n=0}^{N-1}\{x(n)-\tilde{x}(n)\}^2 \quad \text{[Equation 2]}$$

In Equation 2, x(n) denotes an input signal and $\tilde{x}(n)$ denotes the predicted input signal of Equation 1.

The processor of the encoder 100 may quantize LP coefficients using the LP coefficients quantizer 110 and output LP coefficients bitstream $I_a$. When quantizing the LP coefficients directly, the LP synthesis filter 290 of the decoder 200 synthesizing an output signal may be destabilized due to a quantization error. To prevent this, using the LP coefficients quantizer 110, the processor of the encoder 100 may quantize the LP coefficients by converting the LP coefficients into, for example, a line spectral frequency (LSF), an immittance spectral frequency (ISF), or the like.

The processor of the encoder 100 may de-quantize the LP coefficients bitstream using the LP coefficients de-quantizer 115 and output the quantized LP coefficients $\{\hat{a}_i\}$.

The processor of the encoder 100 may calculate a residual signal r(n) based on the quantized LP coefficients $\{\hat{a}_i\}$ and the input signal x(n) using the LP analysis filter 120. As shown in Equation 3, the residual signal r(n) may be calculated in the LP analysis filter 120.

$$r(n)=x(n)+\sum_{i=1}^{P}\hat{a}_i x(n-i), n=0,\ldots,(N-1) \quad \text{[Equation 3]}$$

For example, through the LP analysis, the encoder 100 may reduce a dynamic range of an input signal and obtain a residual signal smoothened for a frequency band.

The LP analysis may be to analyze a speech or audio signal based on a linear model, and may be a process of computing LP coefficients and extracting a residual signal from the speech or audio signal. An LP analysis method is not limited to a specific example, and it is apparent to those skilled in the art that various LP analysis methods may be applied without departing from the spirit of the present disclosure.

For example, the processor of the encoder 100 may input the residual signal r(n) to the trained first neural network block 125. The processor may output a first latent signal $z_p(n)$ based on the input residual signal using the first neural network block 125.

For example, the first latent signal may indicate a code vector which is an expression that an input signal input to the first neural network block 125 and an output signal output from the second neural network block 130 and/or the fourth neural network block 225 are generally reduced in dimension under the same constraints. For example, the first neural network block 125 may output the first latent signal which is a code vector obtained by encoding the input residual signal.

For example, the processor of the encoder 100 may output a first bitstream $I_p$ obtained by quantizing the first latent signal $z_p(n)$ using the first quantization layer 140.

For example, the processor of the encoder 100 may output a quantized first latent signal $\hat{z}_p(n)$ obtained by de-quantizing the first bitstream $I_p$ using the first de-quantization layer 195.

For example, the processor of the encoder 100 may input the quantized first latent signal $\hat{z}_p(n)$ to the second neural network block 130 and decode the quantized first latent signal $\hat{z}_p(n)$. For example, the second neural network block 130 may output a periodic component $\hat{r}_{acb}(n)$ of the decoded residual signal.

For example, the processor of the encoder 100 may calculate an aperiodic component of the residual signal. For example, the aperiodic component of the residual signal may be calculated according to "$r(n)-\hat{r}_{acb}(n)$."

For example, the processor of the encoder 100 may input an aperiodic component $r(n)-\hat{r}_{acb}(n)$ of the residual signal to the third neural network block 135 and output a second latent signal $z_n(n)$. The second latent signal may indicate a code vector which is an expression that an input signal input to the third neural network block 135 and an output signal output from the fifth neural network block 230 are generally reduced in dimension under the same constraints. For example, the third neural network block 135 may output the second latent signal which is a code vector obtained by encoding the input aperiodic component of the residual signal.

For example, the processor of the encoder 100 may output a second bitstream $I_n$ obtained by quantizing the second latent signal $z_n(n)$ using the second quantization layer 145.

The first neural network block 125 may be a neural network model for modeling the periodic component of the residual signal. The third neural network block 135 may be a neural network model for modeling the aperiodic component of the residual signal.

A learning model may be a neural network model including one or more layers and one or more model parameters based on deep learning. However, a type of a neural network model and a quantity of input and output data of the present disclosure are not limited to specific examples.

The encoder 100 may multiplex the first bitstream $I_p$, the second bitstream $I_n$, or the LP coefficients bitstream $I_a$ and transfer the multiplexed bitstream to the decoder 200.

To transfer the first latent signal $z_p(n)$ and/or the second latent signal $z_n(n)$ to the decoder 200, the encoder 100 may perform a quantization process in the first quantization layer 140 and the second quantization layer 145.

A general quantization process may not be differentiable depending on a method or may have discontinuous differential values, so it may not be suitable for updating parameters of a loss function-based neural network model in a training stage of the first neural network block 125 through the fifth neural network block 230.

According to various example embodiments, in a training stage for training a neural network model (e.g., the first neural network block 125 through the fifth neural network block 230), a training device may replace the quantization process with a continuous function approximated in a differentiable form.

For example, in a test stage of the neural network model (e.g., the first neural network block 125 through the fifth neural network block 230), when encoding and decoding an input signal using the neural network model trained with the approximated continuous function, the encoder 100 and/or the decoder 200 may perform a typical quantization process.

For example, as a method of approximating the quantization process in the differentiable form, Softmax quantization, a uniform noise addition method, and the like may be used, but the method is not limited thereto.

For example, the decoder 200 may receive the multiplexed bitstream from the encoder 100, de-multiplex the bitstream, and output the first bitstream $I_p$, the second bitstream $I_n$, and the LP coefficients bitstream $I_a$.

For example, the processor of the decoder 200 may de-quantize the first bitstream $I_p$, the second bitstream $I_n$, and the LP coefficients bitstream $I_a$ using the second de-quantization layer 245, the third de-quantization layer 250, and the LP coefficients de-quantizer 215.

For example, the processor of the decoder 200 may output the quantized first latent signal $\hat{z}_p(n)$, the quantized second latent signal $\hat{z}_n(n)$, and the quantized LP coefficients $\{\hat{a}_i\}$.

For example, the processor of the decoder 200 may input the quantized first latent signal $\hat{z}_p(n)$ to the trained fourth neural network block 225. The fourth neural network block 225 may output the decoded first residual signal $\hat{r}_p(n)$ based on the input quantized first latent signal $\hat{z}_p(n)$.

For example, the processor of the decoder 200 may input the quantized second latent signal $\hat{z}_n(n)$ to the trained fifth neural network block 230. The fifth neural network block 230 may output the decoded second residual signal $\hat{r}_n(n)$ based on the input quantized second latent signal $\hat{z}_n(n)$.

A pair of the first neural network block 125 and the fourth neural network block 225 may have an autoencoder structure for efficiently encoding and decoding the periodic component of the residual signal. A pair of the third neural network block 135 and the fifth neural network block 230 may have an autoencoder structure for efficiently encoding and decoding the aperiodic component of the residual signal.

For example, the fourth neural network block 225 and the fifth neural network block 230 may have structures symmetric to structures of the first neural network block 125 and the third neural network block 135, respectively, and share model parameters between symmetric layers. For example, the first neural network block 125 may output a code vector by encoding an input signal using a trained model parameter. In addition, the fourth neural network block 225 may output a restored input signal by decoding an input code vector using the structure symmetric to the structure of the first neural network block 125 and the model parameter shared between the symmetric layers.

The description of the first neural network block 125 and the fourth neural network block 225 may be applied substantially the same to the first neural network block 125 and the second neural network block 130. For example, the first neural network block 125 and the second neural network block 130 may have symmetric structures and share model parameters between symmetric layers.

For example, the processor of the decoder 200 may calculate the residual signal $\hat{r}(n)$ using the residual signal synthesizing module 280. For example, the processor of the decoder 200 may calculate the residual signal $\hat{r}(n)$ by adding the restored first residual signal $\hat{r}_p(n)$ to the restored second residual signal $\hat{r}_n(n)$ using the residual signal synthesizing module 280.

For example, the processor of the decoder 200 may synthesize an output signal $\hat{x}(n)$ based on the restored residual signal $\hat{r}(n)$ and the quantized LP coefficients $\{\hat{a}_i\}$ using an LP synthesis filter 290.

For example, the processor of the decoder 200 may synthesize the output signal x̂(n) using the restored residual signal r̂(n) and the quantized LP coefficients {â$_i$} according to Equation 4.

$$\hat{x}(n) = \hat{r}(n) - \sum_{i=1}^{p} \hat{a}_i \hat{x}(n-i), n = 0, \ldots, (N-1) \quad \text{[Equation 4]}$$

An LP synthesis may be a process of generating an audio signal from a residual signal using LP coefficients. An LP synthesizing method is not limited to a specific example, and it is apparent to those skilled in the art that various LP synthesizing methods may be applied without departing from the spirit of the present disclosure.

For example, a training device (not shown) for training a neural network model may train the first neural network block 125 through the fifth neural network block 230. For example, the first neural network block 125 through the fifth neural network block 230 shown in FIGS. 1 and 2 may indicate neural networks trained by the training device.

For example, the training device may include at least one of an LP analysis module (e.g., the LP analysis module 160 of FIG. 1), a quantization module (e.g., the quantization module 170 of FIG. 1), a first neural network module (the first neural network module 180 of FIG. 1), a de-quantization module (e.g., the de-quantization modules 190 and 260 of FIG. 1), a second neural network module (e.g., the second neural network module 270 FIG. 1), a residual signal synthesizing module (e.g., the residual signal synthesizing module 280 of FIG. 1), or an LP synthesis filter (e.g., the LP synthesis filter 290 of FIG. 1).

For example, to the LP analysis module, the quantization module, the first neural network module, the de-quantization module, the second neural network module, the residual signal synthesizing module, or the LP synthesis filter of the training device, the description of the encoder 100 and/or the decoder 200 of FIG. 2 may be applied substantially the same.

For example, in a neural network training stage, the training device may calculate a loss function based on at least one of the residual signal r(n) output from the LP analysis filter 120, the restored residual signal r̂(n) output from the residual signal synthesizing module 280, and a bit rate R indicating a quantization entropy obtained in the quantization module 170. In the neural network training stage, the training device may train the first neural network block 125 through the fifth neural network block 230 such that a value of the loss function is minimized.

For example, the training device may calculate a signal distortion D that indicates an error of the restored residual signal r̂(n) compared to the original residual signal r(n) as shown in Equation 5. In Equation 5, D$_{mse}$ denotes a mean-squared error (MSE) and D$_{mae}$ denotes a mean-absolute error (MAE). The signal distortion D may be calculated as the MSE and the MAE, and it is merely an example.

$$D_{mse} = \frac{1}{N} \sum_{n=0}^{N-1} \{r(n) - \hat{r}(n)\}^2 \quad \text{[Equation 5]}$$

$$D_{mae} = \frac{1}{N} \sum_{n=0}^{N-1} |r(n) - \hat{r}(n)|$$

The training device may calculate a loss function $\mathcal{L}$ as shown in Equation 6. In Equation 6, R denotes a bit rate, and $\lambda_{rate}$, $\lambda_{mse}$, and $\lambda_{mae}$ denote weights for the bit rate R, the signal distortion D$_{mse}$, or the signal distortion D$_{mae}$, respectively, and may indicate hyper-parameters that may be set in advance.

$$\mathcal{L} = \lambda_{rate} R + \lambda_{mse} D_{mse}$$

$$\mathcal{L} = \lambda_{rate} R + \lambda_{mae} D_{mae}$$

The training device may train the first neural network block 125, the second neural network block 130, the third neural network block 135, the fourth neural network block 225, and the fifth neural network block 230 to minimize the loss function calculated according to Equation 6. The training device may include quantization and de-quantization layers approximated to be differentiable according to a neural network design in the training process. For example, the training device may train the first neural network block 125 through the fifth neural network block 230 by back-propagating the error calculated through the loss function, and it is merely an example. For example, when the second neural network block 130 and/or the fourth neural network block 225 is designed to have the symmetric structures to that of the first neural network block 125, and/or when the fifth neural network block 230 is designed to have the symmetric structure to that of the third neural network block 135, the training device may train by constraining the model parameters between the symmetric layers to have the same value.

For example, the encoder 100 or the decoder 200 of FIGS. 1 and 2 may encode or decode an input signal using the first neural network block 125 through the fifth neural network block 230 trained by the training device.

Referring to FIG. 2, the encoder 100 according to various example embodiments may pre-normalize intrinsic characteristics of the input signal, such as speech and music, through a frequency flattening effect according to the LP analysis. Neural network models for encoding and decoding a residual signal, for example, the first neural network block 125 through the fifth neural network block 230 may be robust to a characteristic change of the input signal, so that an encoding quality of the input signal may be improved. For example, the encoder 100 and the decoder 200 of the present disclosure may solve mismatching between an input signal for training and an input signal for a test.

In FIG. 2, a configuration including the first neural network block 125, the first quantization layer 140, the second de-quantization layer 245, and the fourth neural network block 225 may be referred to as an adaptive codebook neural network that models a periodic component of a residual signal. In addition, a configuration including the third neural network block 135, the second quantization layer 145, the second de-quantization layer 245, and the fifth neural network block 230 may be referred to as a fixed codebook neural network that models an aperiodic component of the residual signal.

For example, the adaptive codebook neural network may model the periodic component of the residual signal. The fixed codebook neural network may model the aperiodic component of the residual signal in a form of noise.

As shown in FIG. 2, the present disclosure may have a neural network structure in which the adaptive codebook neural network (e.g., the configuration including the first neural network block 125, the first quantization layer 140, the second de-quantization layer 245, and the fourth neural network block 225) and the fixed codebook neural network (e.g., the configuration including the third neural network block 135, the second quantization layer 145, the third de-quantization layer 250, and the fifth neural network block 230) have different attributes in an LP analysis framework.

For example, the first neural network block 125 and the fourth neural network block 225 of the adaptive codebook neural network may include a recurrent neural network, and the third neural network block 135 and the fifth neural network block 230 of the fixed codebook neural network may include the feed-forward neural network. Each of the first neural network block 125, the third neural network block 135, the fourth neural network block 225, and the fifth neural network block 230 may include a neural network suitable for a component of an input signal to be modeled to improve the encoding quality of the input signal.

For example, the encoder 100 and the decoder 200 according to the present disclosure may model the residual signal corresponding to an output of the LP analysis filter 120 through dual-path neural networks. Dual paths may indicate a path for processing the residual signal through the first neural network block 125 and the fourth neural network block 225 and a path for processing the residual signal through the third neural network block 135 and the fifth neural network block 230.

The encoder 100 and the decoder 200 according to the present disclosure may restore the residual signal using residual signals (e.g., the first residual signal and the second residual signal) output from the adaptive codebook neural network and the fixed codebook neural network.

The description of the fourth neural network block 225 may be applied substantially the same to the description of the second neural network block 130.

Figure 3:
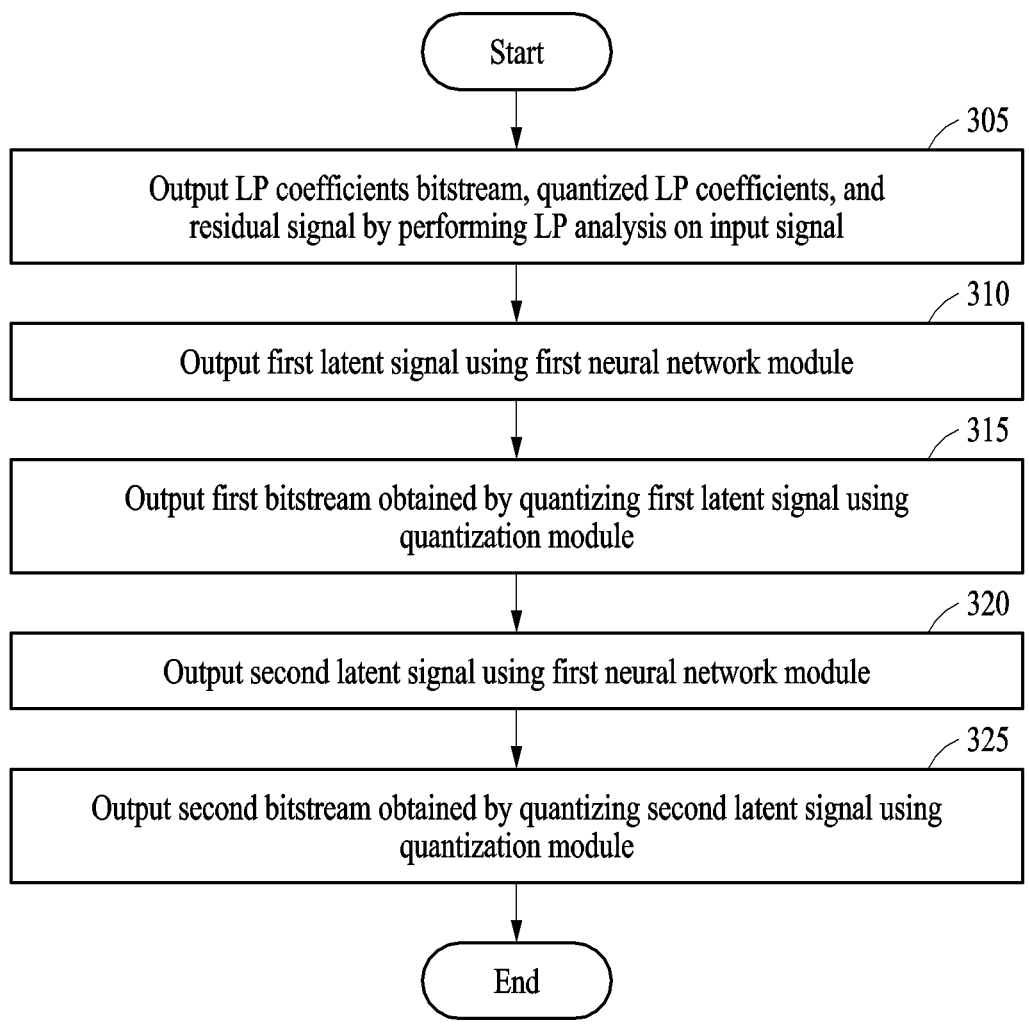
FIG. 3 is a diagram illustrating an operation of an encoder outputting LP coefficients bitstream, a first bitstream, and a second bitstream according to various example embodiments.

FIG. 3 is a diagram illustrating an operation of the encoder 100 outputting LP coefficients bitstream, a first bitstream, and a second bitstream according to various example embodiments.

Referring to FIG. 3, in operation 305, the encoder 100 according to various example embodiments may output LP coefficients bitstream and a residual signal by performing an LP analysis on an input signal.

In operation 305, the encoder 100 may calculate LP coefficients from the input signal. For example, the encoder 100 may calculate the LP coefficients from the input signal using the LP coefficients calculator 105.

The encoder 100 may output the LP coefficients bitstream using the LP coefficients. For example, the encoder 100 may output the LP coefficients bitstream from the LP coefficients using the LP coefficients quantizer 110.

The encoder 100 may calculate a quantized LP coefficients using the LP coefficients bitstream. For example, the encoder 100 may calculate the quantized LP coefficients using the LP coefficients de-quantizer 115.

The encoder 100 may calculate the residual signal using the quantized LP coefficients. For example, the encoder 100 may calculate the residual signal from the quantized LP coefficients using the LP analysis filter 120.

In operation 310, the encoder 100 may output a first latent signal using the first neural network module 180. For example, the processor of the encoder 100 may input the residual signal to the first neural network block 125 and output the first latent signal. For example, the first latent signal may indicate a code vector obtained by modeling a periodic component of the residual signal or a code vector obtained by encoding a periodic component of the residual signal. For example, the first neural network block 125 may include a recurrent neural network that encodes the periodic component of the residual signal.

In operation 315, the encoder 100 may output a first bitstream obtained by quantizing the first latent signal using the quantization module 170. For example, a processor may output the first bitstream obtained by quantizing the first latent signal using the first quantization layer 140.

In operation 320, the encoder 100 may output a second latent signal using the trained first neural network module 180. For example, the processor may input an aperiodic component of the residual signal to the third neural network block 135 and output the second latent signal. For example, the second latent signal may indicate a code vector obtained by modeling the aperiodic component of the residual signal or a code vector obtained by encoding the aperiodic component of the residual signal. For example, the third neural network block 135 may include a feed-forward neural network that encodes the aperiodic component of the residual signal.

For example, the aperiodic component of the residual signal may be calculated based on a periodic component of a restored residual signal. For example, the periodic component of the restored residual signal may be decoded from the quantized first latent signal output by de-quantizing the first bitstream.

In operation 325, the encoder 100 may output a second bitstream obtained by quantizing the second latent signal using the quantization module 170. For example, the processor may output the second bitstream obtained by quantizing the second latent signal using the second quantization layer 145.

For example, the encoder 100 may multiplex the LP coefficients bitstream, the first bitstream, and the second bitstream and transmit a result of the multiplexing to the decoder 200.

Figure 4:
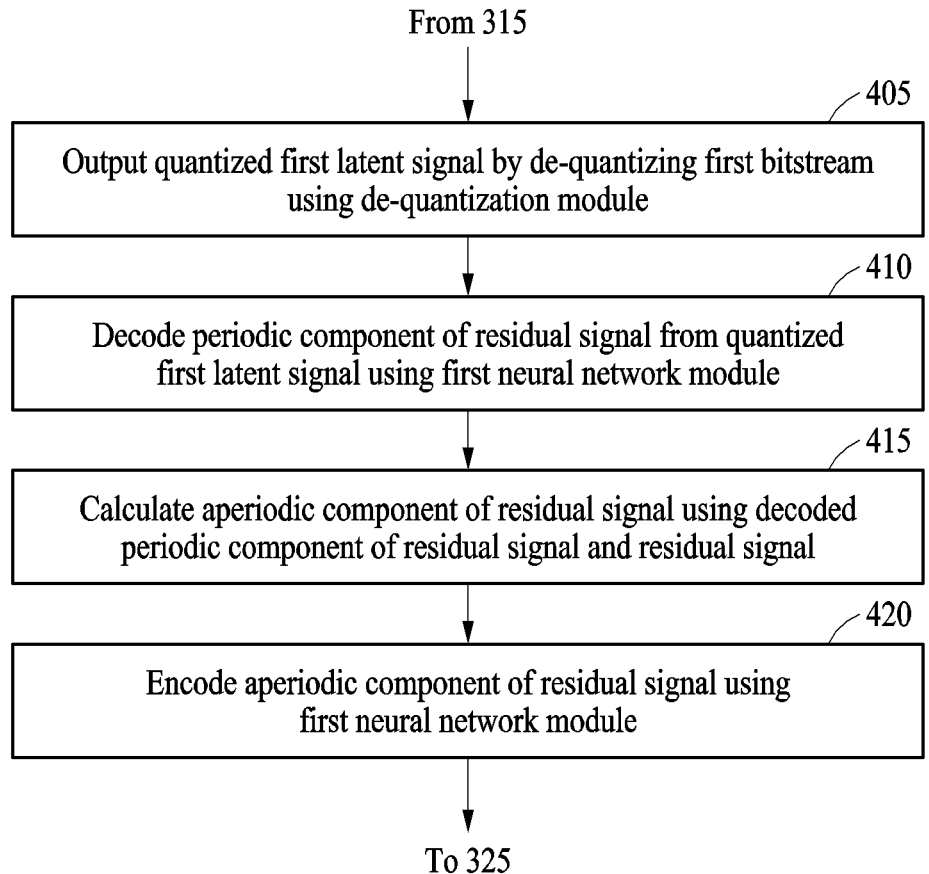
FIG. 4 is a flowchart illustrating an operation of an encoder outputting a second latent signal according to various example embodiments.

FIG. 4 is a flowchart illustrating an operation of the encoder 100 outputting a second latent signal according to various example embodiments.

Referring to FIG. 4, in operation 405, the encoder 100 according to various example embodiments may output a quantized first latent signal by de-quantizing a first bitstream using the de-quantization module 190. For example, the encoder 100 may de-quantize the first bitstream using the de-quantization module 190. The encoder 100 may de-quantize the first bitstream using the first de-quantization layer 195. The encoder 100 may output the quantized first latent signal by de-quantizing the first bitstream.

In operation 410, the encoder 100 may decode the quantized first latent signal using the first neural network module 180. For example, the encoder 100 may input the quantized first latent signal to the second neural network block 130 and decode a periodic component of a residual signal.

For example, the second neural network block 130 may have a structure symmetric to a structure of the first neural network block 125 and share a model parameter between symmetric layers. For example, the first neural network block 125 may indicate a neural network model that encodes an input signal and outputs a code vector. The second neural network block 130 may indicate a neural network model that decodes the code vector inputted and outputs the restored input signal.

In operation 415, the encoder 100 may calculate an aperiodic component of the residual signal using the decoded periodic component of the residual signal and the residual signal. For example, the aperiodic component of the residual signal may indicate a result obtained by removing the periodic component of the decoded residual signal from the residual signal.

In operation 420, the encoder 100 may encode the aperiodic component of the residual signal using the first neural network module 180. For example, the encoder 100 may encode the aperiodic component of the residual signal using the third neural network block 135. For example, the encoder 100 may encode the aperiodic component of the residual signal and output the second latent signal.

Figure 5:
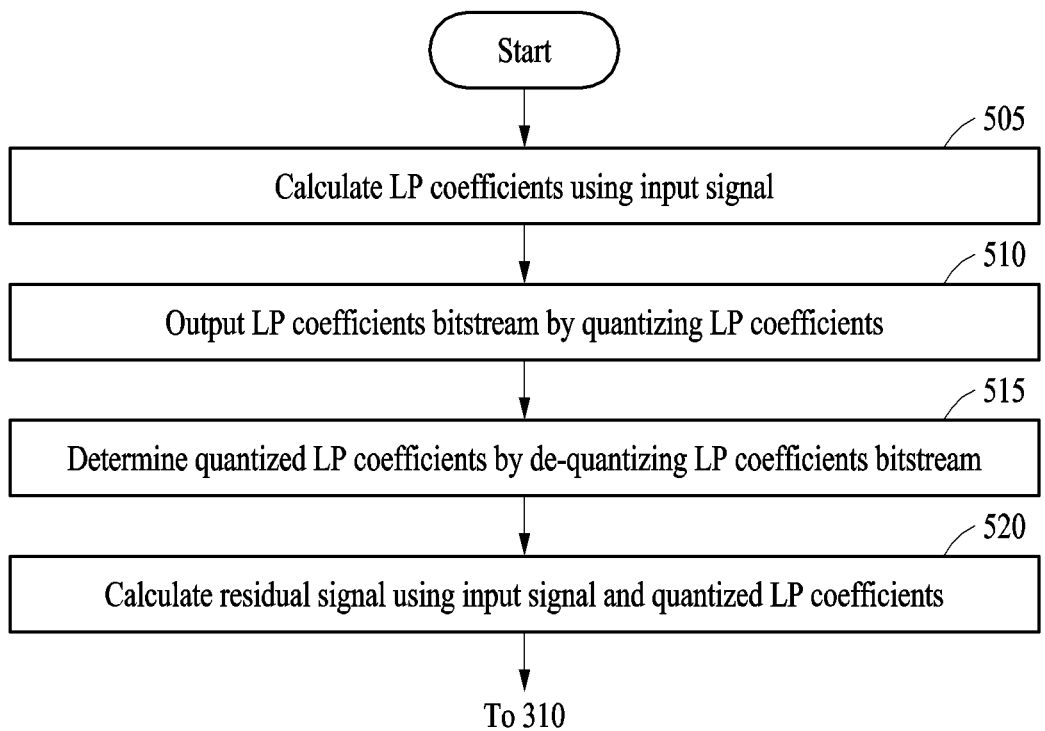
FIG. 5 is a flowchart illustrating an operation of an encoder calculating a residual signal according to various example embodiments.

FIG. 5 is a flowchart illustrating an operation of an encoder calculating a residual signal according to various example embodiments.

Referring to FIG. 5, in operation 505, the encoder 100 according to various example embodiments may calculate LP coefficients using an input signal. For example, a processor of the encoder 100 may calculate the LP coefficients for each frame corresponding to an analysis unit of the input signal using the LP coefficients calculator 105.

In operation 510, the encoder 100 may output the LP coefficients bitstream by quantizing the LP coefficients. For example, the processor of the encoder 100 may input the LP coefficients to the LP coefficients quantizer 110 and output the LP coefficients bitstream from the LP coefficients quantizer 110.

In operation 515, the encoder 100 may determine the quantized LP coefficients by de-quantizing the LP coefficients bitstream. For example, the processor of the encoder 100 may calculate the quantized LP coefficients by de-quantizing the LP coefficients bitstream using the LP coefficients de-quantizer 115.

In operation 520, the encoder 100 may calculate a residual signal using the input signal and the quantized LP coefficients. For example, the processor may calculate the residual signal using the input signal and the quantized LP coefficients as shown in Equation 3.

Figure 6:
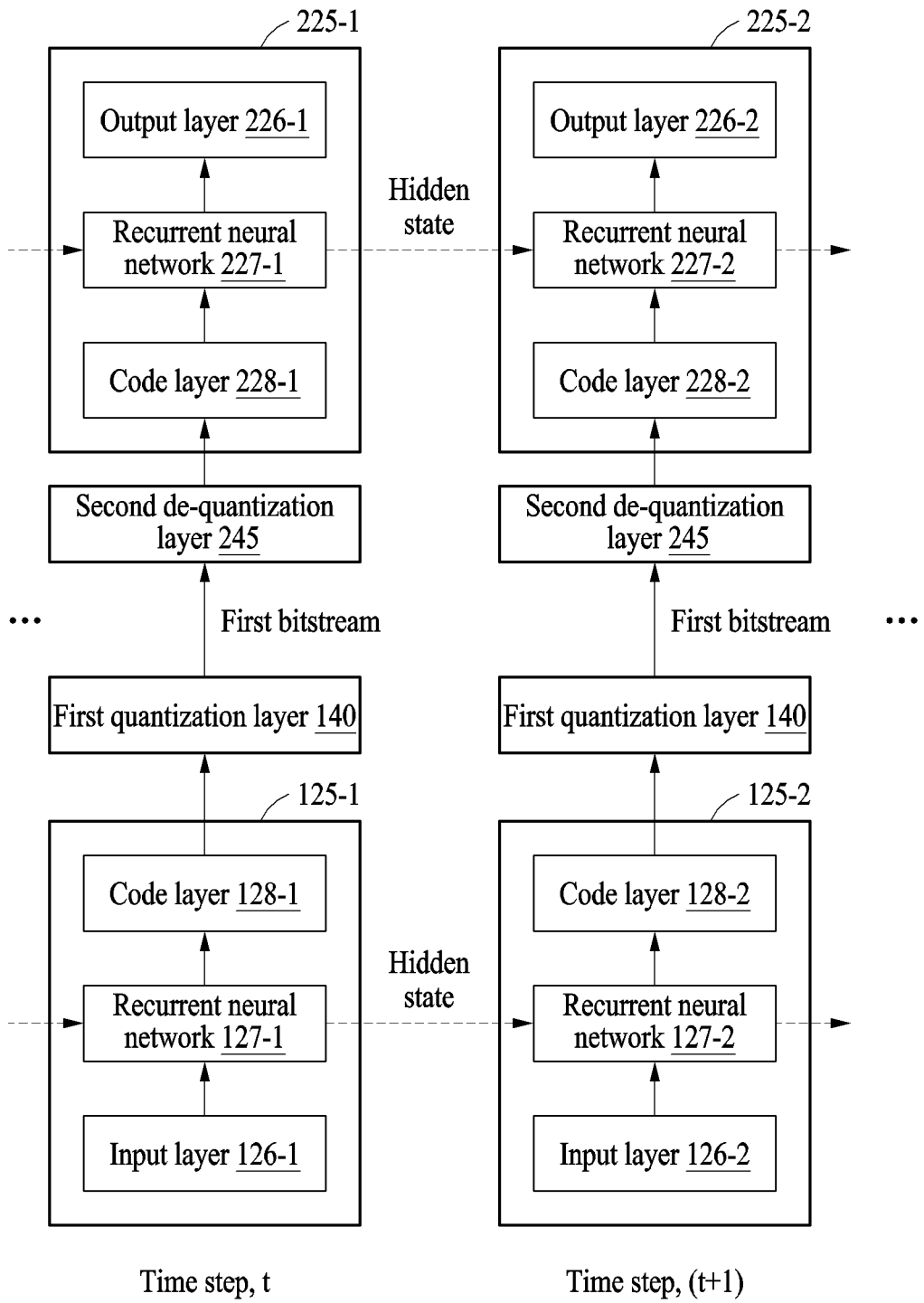
FIG. 6 is a diagram illustrating a first neural network block and a fourth neural network block including recurrent neural networks according to various example embodiments.

FIG. 6 is a diagram illustrating a first neural network block 125-1, 125-2 and a fourth neural network block 225-1, 225-2 including a recurrent neural network 127-1, 127-2, 227-1, 227-2 according to various example embodiments the recurrent neural network 127-1, 127-2, 227-1, 227-2.

Referring to FIG. 6, the first neural network block 125-1, 125-2 according to various example embodiments may include an input layer 126-1, 126-2, the recurrent neural network 127-1, 127-2, or a code layer 128-1, 128-2. The fourth neural network block 225-1, 225-2 according to various example embodiments may include a code layer 228-1, 228-2, the recurrent neural network 227-1, 227-2, and an output layer 226-1, 226-2.

FIG. 6 illustrates the first neural network block 125-1, 125-2 and the fourth neural network block 225-1, 225-2 at a time step t and a time step t+1. The first neural network block 125-1, 125-2 and the fourth neural network block 225-1, 225-2 may each include the recurrent neural network 127-1, 127-2, 227-1, 227-2. At the time step t+1, a hidden state of the recurrent neural network 127-1, 227-1 at the time step t may be input to the recurrent neural network 127-2, 227-2.

For example, at the time step t, a hidden state at a previous time step t−1, which is not shown in FIG. 6, may be input to the recurrent neural network 127-1 and 227-1 of the first neural network block 125-1 and the fourth neural network block 225-1.

For example, at the time step t, a residual signal may be input to the input layer 126-1 of the first neural network block 125-1. The code layer 128-1 may output a code vector, for example, a first latent signal based on a signal output from the recurrent neural network 127-1 of the first neural network block 125-1.

For example, the first quantization layer 140 may output a first bitstream obtained by quantizing the first latent signal. The encoder 100 may transmit the first bitstream to the first de-quantization layer 195.

For example, the second de-quantization layer 245 may de-quantize the first bitstream and output the quantized first latent signal. The quantized first latent signal may be input to the code layer 228-1 of the fourth neural network block 225-1.

The recurrent neural network 227-1 of the fourth neural network block 225-1 may output a signal to the output layer 226-1 based on the quantized first latent signal input to the code layer 228-1. The output layer 226-1 may output the decoded first residual signal based on the signal output from the recurrent neural network 227-1 of the fourth neural network block 225-1.

Substantially like the operations of the first neural network block 125-1 and the fourth neural network block 225-1 at the time step t, at the time step t+1, hidden states of the recurrent neural networks 127-1 and 227-1 at the time step t may be input to the recurrent neural networks 127-2 and 227-2 of the first neural network block 125-2 and the fourth neural network block 225-2.

At the time step t+1, the first neural network block 125-2, the fourth neural network block 225, the first quantization layer 140, and the second de-quantization layer 245 may operate substantially the same as the operations at the time step t.

As described above, the first neural network block 125 and the fourth neural network block 225 may include the recurrent neural networks 127 and 227. The recurrent neural networks 127 and 227 may operate to transfer hidden state information of a previous time step to the recurrent neural networks 127 and 227 at a subsequent time step. The first neural network block 125 and the fourth neural network block 225 may include the recurrent neural networks 127 and 227 to improve the encoding quality when modeling a periodic component of the residual signal, for example, modeling long-term redundancy.

For example, the first neural network block 125, the first quantization layer 140, the second de-quantization layer 245, and the fourth neural network block 225 may be trained based on an end-to-end method.

FIG. 6 illustrates operations of the first neural network block 125, the first quantization layer 140, the second de-quantization layer 245, and the fourth neural network block 225 at the time steps t and t+1. The second neural network block 130 according to an example embodiment may include a configuration substantially the same as that of the fourth neural network block 225 and operate in substantially the same way.

For example, the first bitstream output from the first quantization layer 140 of FIG. 6 may be input to the first de-quantization layer 195. The first de-quantization layer 195 may output the quantized first latent signal by de-quantizing the first bitstream.

For example, the quantized first latent signal may be input to a code layer of the second neural network block 130. The recurrent neural network of the second neural network block 130 may output a signal to an output layer based on the quantized first latent signal input to the code layer. The output layer may output the decoded first residual signal.

As described above, the second neural network block 130 may include a code layer, a recurrent neural network, and an output layer, substantially like the fourth neural network block 225. For example, at least one of a structure, a layer, or a model parameter of the fourth neural network block 225 may be substantially the same as that of the second neural network block 130. For example, the second neural network block 130 may operate substantially the same as the fourth neural network block 225 using the quantized first latent signal output from the first de-quantization layer 195.

Figure 7:
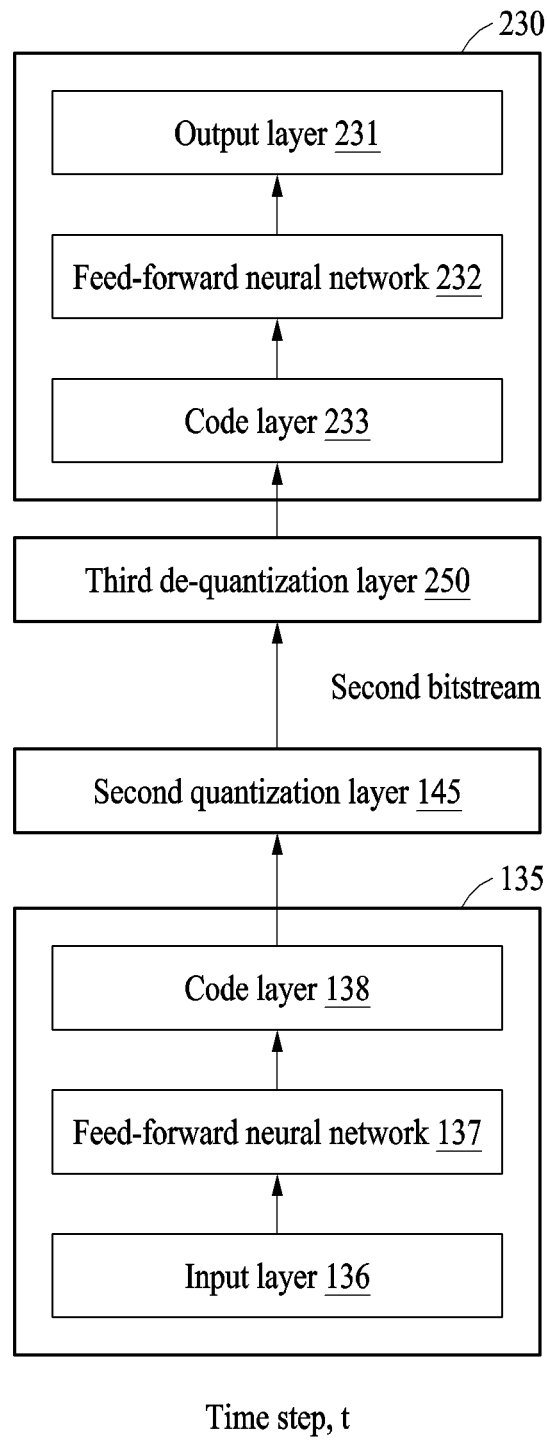
FIG. 7 is a diagram illustrating a third neural network block and a fifth neural network block including feed-forward neural networks according to various example embodiments.

FIG. 7 is a diagram illustrating the third neural network block 135 and the fifth neural network block 230 including feed-forward neural networks 137 and 232 according to various example embodiments.

Referring to FIG. 7, the third neural network block 135 according to various example embodiments may include an input layer 136, the feed-forward neural network 137, and a code layer 138. The fifth neural network block 230 according to various example embodiments may include a code layer 233, the feed-forward neural network 232, and an output layer 231.

For example, at a time step t, a residual signal may be input to the input layer 136 of the third neural network block 135. The code layer 138 may output a code vector, for example, a second latent signal based on a signal output from the feed-forward neural network 137 of the third neural network block 135.

For example, the second quantization layer 145 may output a second bitstream obtained by quantizing the second latent signal. The encoder 100 may transmit the second bitstream to the third de-quantization layer 250 of the decoder 200.

For example, the third de-quantization layer 250 may output the quantized second latent signal by de-quantizing the second bitstream. The quantized second latent signal may be input to the code layer 233 of the fifth neural network block 230. The feed-forward neural network 232 of the fifth neural network block 230 may output a signal to the output layer 231 based on the second latent signal input to the code layer 233. The output layer 231 may output the decoded second residual signal based on the signal output from the feed-forward neural network 232 of the fifth neural network block 230.

For example, the third neural network block 135, the second quantization layer 145, the third de-quantization layer 250, and the fifth neural network block 230 may be trained based on an end-to-end method.

As described with reference to FIGS. 6 and 7, the first neural network block 125, the second neural network block 130, and the fourth neural network block 225 may include the recurrent neural networks 127 and 227. The third neural network block 135 and the fifth neural network block 230 may include the feed-forward neural networks 132 and 232.

A periodic component of an input signal corresponding to a speech signal or an audio signal may be processed using the first neural network block 125, the second neural network block 130, and the fourth neural network block 225 including the recurrent neural networks 127 and 227. An aperiodic component of the input signal may be processed using the third neural network block 135 and the fifth neural network block 230 including the feed-forward neural networks 132 and 232.

According to various example embodiments of the present disclosure, it is possible to improve the encoding quality of the input signal using a processing result obtained by neural networks having different attributes.

Figure 8:
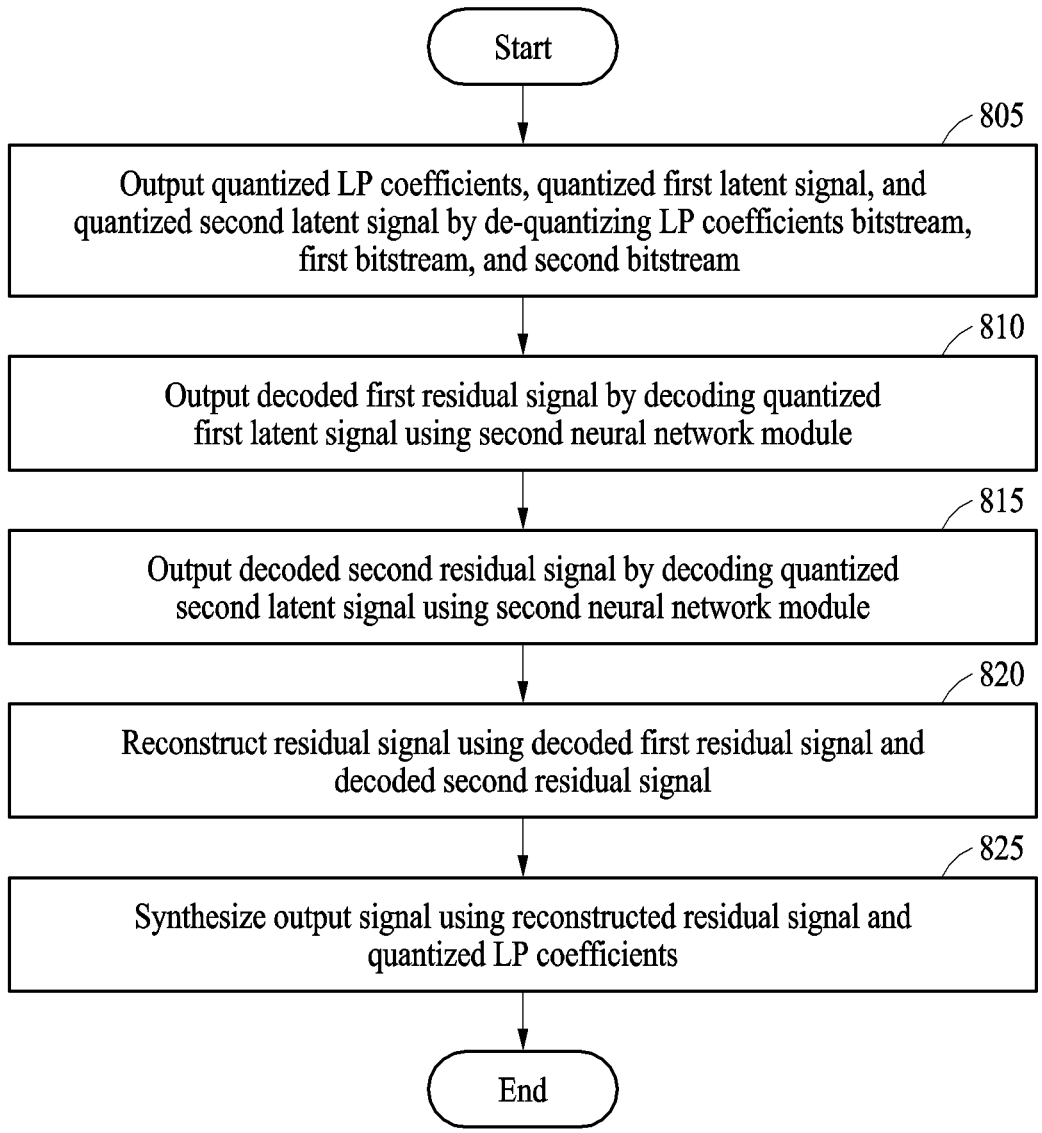
FIG. 8 is a diagram illustrating operations of a decoding method according to various example embodiments.

FIG. 8 is a diagram illustrating operations of a decoding method according to various example embodiments.

Referring to FIG. 8, in operation 805, a processor of the decoder 200 according to various example embodiments may output a quantized LP coefficients, a quantized first latent signal, and a quantized second latent signal by de-quantizing LP coefficients bitstream, a first bitstream, and a second bitstream.

For example, the decoder 200 may output the quantized LP coefficients, the quantized first latent signal, and the quantized second latent signal using the de-quantization module 260.

In operation 810, the processor of the decoder 200 may output a first residual signal restored by decoding the quantized first latent signal, using the trained second neural network module 270.

In operation 815, the processor of the decoder 200 may output a second residual signal restored by decoding the quantized second latent signal using the trained second neural network module 270.

For example, the second neural network module 270 may include the fourth neural network block 225 and the fifth neural network block 230.

In operation 810, the processor of the decoder 200 may decode the quantized first latent signal and output the decoded first residual signal using the fourth neural network block 225.

In operation 815, the processor of the decoder 200 may decode the quantized second latent signal and output the decoded second residual signal using the fifth neural network block 230.

The second neural network module 270 may include the fourth neural network block 225 and the fifth neural network block 230.

In operation 820, the processor of the decoder 200 may reconstruct the residual signal using the restored first residual signal and the restored second residual signal. For example, the processor of the decoder 200 may restore the residual signal using the residual signal synthesizing module 280. The restored first residual signal and the stored second residual signal may be the decoded first residual signal and the decoded second residual signal, respectively.

In operation 825, the processor of the decoder 200 may synthesize an output signal using the restored residual signal and the quantized LP coefficients. For example, the processor of the decoder 200 may synthesize the output signal using the LP synthesis filter 290.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described devices may be configured to act as one or more software modules in order to perform the operations of the above-described example embodiments, or vice versa.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An encoding method comprising:
    outputting LP coefficients bitstream and a residual signal by performing an LP analysis on an input signal;
    outputting a first latent signal obtained by encoding a periodic component of the residual signal, using a first neural network module;
    outputting a first bitstream obtained by quantizing the first latent signal, using a quantization module;
    outputting a second latent signal obtained by encoding an aperiodic component of the residual signal, using the first neural network module; and
    outputting a second bitstream obtained by quantizing the second latent signal, using the quantization module,
    wherein the aperiodic component of the residual signal is calculated based on a periodic component of the residual signal decoded from the quantized first latent signal output by de-quantizing the first bitstream.

2. The encoding method of claim 1, wherein the outputting of the second latent signal comprises:
    outputting the quantized first latent signal by de-quantizing the first bitstream, using a de-quantization module;
    decoding the periodic component of the residual signal from the quantized first latent signal, using the first neural network module;
    calculating the aperiodic component of the residual signal using the decoded periodic component of the residual signal and the residual signal; and
    encoding the aperiodic component of the residual signal, using the first neural network module.

3. The encoding method of claim 1, wherein the outputting of the residual signal comprises:
    calculating LP coefficients using the input signal;
    outputting the LP coefficients bitstream by quantizing the LP coefficients;
    determining the quantized LP coefficients by de-quantizing the LP coefficients bitstream; and
    calculating the residual signal using the input signal and the quantized LP coefficients.

4. The encoding method of claim 1, wherein the first neural network module comprises:
    a first neural network block to encode the periodic component of the residual signal;
    a second neural network block to decode the quantized first latent signal; and
    a third neural network block to encode the aperiodic component of the residual signal.

5. The encoding method of claim 4, wherein the first neural network block and the second neural network block comprise recurrent neural networks,
    the third neural network block comprises a feed-forward neural network.

6. A decoding method comprising:
    outputting quantized LP coefficients, a quantized first latent signal, and a quantized second latent signal by de-quantizing LP coefficients bitstream, a first bitstream, and a second bitstream;
    outputting a first residual signal by decoding the quantized first latent signal, using a second neural network module;
    outputting a second residual signal by decoding the quantized second latent signal using the second neural network module;
    reconstructing a residual signal using the decoded first residual signal and the decoded second residual signal; and synthesizing an output signal using the reconstructed residual signal and the quantized LP coefficients.

7. The decoding method of claim 6, wherein the second neural network module comprises:
a fourth neural network block to decode the quantized first latent signal; and
a fifth neural network block to decode the quantized second latent signal.

8. The decoding method of claim 7, wherein the fourth neural network block comprises a recurrent neural network, and
the fifth neural network block comprises a feed-forward neural network.

9. An encoder comprising:
a processor,
wherein the processor is configured to:
output LP coefficients bitstream and a residual signal by performing an LP analysis on an input signal;
output a first latent signal obtained by encoding a periodic component of the residual signal, using a first neural network module;
output a second latent signal obtained by encoding an aperiodic component of the residual signal, using the first neural network module; and
output a first bitstream and a second bitstream obtained by quantizing the first latent signal and the second latent signal, using a quantization module, and
the aperiodic component of the residual signal is calculated based on a periodic component of the residual signal decoded from the quantized first latent signal output by de-quantizing the first bitstream.

10. The encoder of claim 9, wherein the processor is configured to:
output the quantized first latent signal by de-quantizing the first bitstream, using a de-quantization module;
decode the periodic component of the residual signal from the quantized first latent signal, using the first neural network module; and
calculate the aperiodic component of the residual signal using the decoded periodic component of the residual signal and the residual signal.

11. The encoder of claim 9, wherein the processor is configured to:
calculate LP coefficients using the input signal;
output the LP coefficients bitstream by quantizing the LP coefficients;
determine the quantized LP coefficients by de-quantizing the LP coefficients bitstream; and
calculate the residual signal using the input signal and the quantized LP coefficients.

12. The encoder of claim 9, wherein the first neural network module comprises:
a first neural network block to encode the periodic component of the residual signal;
a second neural network block to decode the quantized first latent signal; and
a third neural network block to encode the aperiodic component of the residual signal.

13. The encoder of claim 12, wherein the first neural network block and the second neural network block comprise recurrent neural networks,
the third neural network block comprises a feed-forward neural network.

14. A decoder comprising:
a processor,
wherein the processor is configured to:
output quantized LP coefficients, a quantized first latent signal, and a quantized second latent signal by de-quantizing LP coefficient bitstream, a first bitstream, and a second bitstream;
reconstruct a first residual signal by decoding the quantized first latent signal, using a second neural network module;
reconstruct a second residual signal by decoding the quantized second latent signal using the second neural network module;
reconstruct a residual signal, using the reconstructed first residual signal and the reconstructed second residual signal; and
synthesize an output signal, using the reconstructed residual signal and the quantized LP coefficients.

* * * * *